(12) United States Patent
Nigrin

(10) Patent No.: US 6,508,142 B1
(45) Date of Patent: Jan. 21, 2003

(54) STEERING WHEEL WITH A CLAMPING HUB

(75) Inventor: Anke Nigrin, Lohr (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/553,209

(22) Filed: Apr. 20, 2000

(30) Foreign Application Priority Data

Apr. 22, 1999 (DE) .................................. 299 07 181 U

(51) Int. Cl.$^7$ ................................................. B62B 1/18
(52) U.S. Cl. ........................ 74/552; 403/12; 280/779; 74/493
(58) Field of Search ................. 74/552, 484 R, 74/492, 493; 403/12; 280/771, 779

(56) References Cited

U.S. PATENT DOCUMENTS

| | | | | |
|---|---|---|---|---|
| 4,358,874 | A | * 11/1982 | Kaiser | 403/12 |
| 5,333,978 | A | 8/1994 | Rives | 411/389 |
| 5,555,772 | A | * 9/1996 | Schneider | 74/493 |
| 5,605,351 | A | * 2/1997 | Higashino | 74/493 |
| 5,713,245 | A | * 2/1998 | Bobbitt, III et al. | 74/493 |
| 5,743,150 | A | * 4/1998 | Fevre et al. | 74/493 |
| 5,787,759 | A | * 8/1998 | Olgren | 74/493 |
| 5,848,806 | A | * 12/1998 | Hosoi et al. | 74/552 |

FOREIGN PATENT DOCUMENTS

| | | |
|---|---|---|
| DE | 1102499 | 3/1961 |
| DE | 4013810 A1 | * 10/1991 |
| DE | 29722825 U1 | 5/1998 |
| DE | 19734785 A1 | 2/1999 |
| EP | 926040 A1 | * 6/1999 |

* cited by examiner

Primary Examiner—Chong H. Kim
(74) Attorney, Agent, or Firm—Tarolli, Sundheim, Covell, Tummino & Szabo L.L.P.

(57) ABSTRACT

A steering wheel for vehicles is provided which comprises a hub for attachment on a steering column and a clamping screw. The hub has a central, substantially cylindrical passage for accommodation of an end section of the steering column and at least one slit extending parallel to the passage. Two hub sections are defined on opposite sides of the slit. The hub sections have aligned bores that extend substantially tangentially to the passage. A first one of these bores has an internal thread, and the clamping screw is adapted to extend through a second one of these bores and to be screwed into the first one of the bores, thereby clamping the hub on the steering column end section. A screw holder is attached to the hub for limited movement in an axial direction of the clamping screw against spring force. The screw holder has a recess for passage of the screw and simultaneous engagement into the thread of the screw. The screw holder is formed by a bracket of spring steel. The clamping screw has a shaft with a screw thread formed on substantially the length of the shaft. In a further preferred embodiment, the clamping screw has an abutment formed by a radially projecting collar on a central part of the shaft.

5 Claims, 2 Drawing Sheets

STEERING WHEEL WITH A CLAMPING HUB

The present invention relates to a steering wheel comprising a one piece hub for fastening of the steering wheel on a steering column.

BACKGROUND OF THE INVENTION

Such steering wheels are currently produced by casting from aluminum- or magnesium alloys and are provided with a casing of plastic. Since, in modern vehicles, the steering column for safety reasons has an end spaced from a plane defined by the steering wheel rim, the steering wheel spokes run in a funnel shape from the steering wheel rim to the steering wheel hub, which is structured for fastening on the steering column. A type of fastening which has proved successful for decades and is used in numerous vehicle series is characterized in that the hub of the steering wheel is placed onto the end of the steering column and is tensioned by means of a nut screwed on the end face onto the steering column against a tapered abutment face on the steering column. This connection is generally supplemented by a spline connection.

When the steering wheel is equipped with an inflatable airbag, this type of connection of the steering wheel with the steering column is only possible if the airbag module can be installed after the steering wheel has been mounted on the steering column. This installation sequence is undesired, because it delays the final installation of the vehicle and because the fastening of the airbag module in the steering wheel must be structurally coordinated therewith, which—compared with a pre-installation of the airbag module in the steering wheel—is more costly and more complicated. One has therefore endeavored for a long time to present possibilities in which the steering wheel together with the incorporated airbag module can be supplied for final installation and can be fastened on the steering column. If screws are used which extend parallel to the steering column and are inserted from the rear face of the steering wheel, the installation is made very difficult, because the space behind the steering wheel is only accessible with difficulty in many vehicles. If one or more fastening screws are arranged radially to the steering wheel column, further fastening elements are necessary in order to be able to secure the steering wheel axially to the steering column and to provide a reliable connection for the transmission of the steering forces. The handling of additional fastening elements is complicated and still requires too much time in the final installation, which for economic reasons is to be as short as possible.

From the German Utility Model 297 22 825 a steering wheel is known in which the hub region is divided by slits arranged parallel to the steering column axis into hub sections which are able to be tensioned radially with respect to each other. After the steering wheel has been placed onto the steering column and both parts are aligned with each other in the appropriate position, bracing takes place by a screw which is arranged tangentially to the bore in the steering wheel hub to press the hub sections of the steering wheel hub against the shaft of the steering column, and the screw engages tangentially into an encircling groove on the steering column to ensure axial attachment of the steering wheel on the steering column. Thereby, all the requirements with regard to short final installation times and a structurally simplified structural unit of the steering wheel and airbag module can be realized, without restrictions having to be taken into account with regard to safety and reliability of the fastening of the steering wheel on the steering column.

The hub sections devided by slits can only be tensioned with respect to each other by means of a tangentially arranged tightening screw when they have through-bores and are arranged between an external nut and the head of the tightening screw. As a separate nut is undesired in the final installation, the necessary thread in the known steering wheel is arranged in one of the two hub sections, and the other hub section is provided with a through-bore and a stop for the screw head.

In the event of dismounting of the steering wheel from the steering column, a problem arises in that the screw can not be sufficiently retracted to disengage from the encircling groove of the steering column, so that the steering wheel can not be pulled off from the steering column. As the screw head is not to project outwards over the steering wheel covering, it can not be gripped, unless a large recess is provided in the steering wheel covering, which likewise is not desired.

BRIEF SUMMARY OF THE INVENTION

The present invention provides an improved steering wheel with a fastening screw forming part of a structural unit, consisting of the steering wheel proper and an airbag module, without a requirement for a separate component for final installation such as a separate nut, thereby facilitation the mounting and dismounting procedures.

According to the invention, a steering wheel for vehicles is provided which comprises a hub for attachment on a steering column and a clamping screw. The hub has a central, substantially cylindrical passage for accommodation of an end section of the steering column and at least one slit extending parallel to the passage. Two hub sections are defined on opposite sides of the slit. The hub sections have aligned bores that extend substantially tangentially to the passage. A first one of the bores has an internal thread, and the clamping screw is adapted to extend through a second one of these bores and to be screwed into the first one of the bores, thereby clamping the hub on the steering column end section. A screw holder is attached to the hub for limited movement in an axial direction of the clamping screw against spring force. The screw holder has a recess for passage of the screw and simultaneous engagement into the thread of the screw. Preferably, the screw holder is formed by a bracket of spring steel, and the clamping screw has a shaft with a screw thread formed on substantially the length of the shaft. In a further preferred embodiment, the clamping screw has an abutment formed by a radially projecting collar on a central part of the shaft.

With the arrangement of a non-rotatable, axially elastically deflectable screw holder the problems initially indicated are removed. The screw holder is arranged so that the screw, on mounting of the steering wheel, must be pushed forward axially against the spring force until its front end engages into the internally threaded bore in one of the hub sections. Thereby, screw holder is axially biased, so that an axial restoring force acts permanently on the screw with the installed steering wheel, even when the screw is screwed forward further. An axial clamping force acts on the screw as long as the screw thread is still in engagement with the inner thread within the corresponding hub section. If the screw thread comes out from the inner thread, the screw is pulled back by the axial spring bias of the screw holder so that it no longer engages tangentially into the encircling groove of the steering column. The abutment collar on the central part of the screw shaft provides for a limitation of screw engagement by abutment on the hub surface. Another purpose of the abutment collar is to limit withdrawl of the clamping screw so that it remains attached to the hub. With the non-rotatable, axially elastically deflectable screw holder for the clamping screw, a solution was found by which the conventional steering wheel structure with two hub sections, able to be tensioned elastically with respect to each other, can be mounted and dismounted in a conceivable simple manner without the provision of additional fastening means.

BRIEF DESCRIPTION OF THE DRAWINGS

Further details are explained more closely with the aid of the example embodiment illustrated in FIGS. 1 to 3, in which.

DETAILED DESCRIPTION OF THE INVENTION

Figure 1:
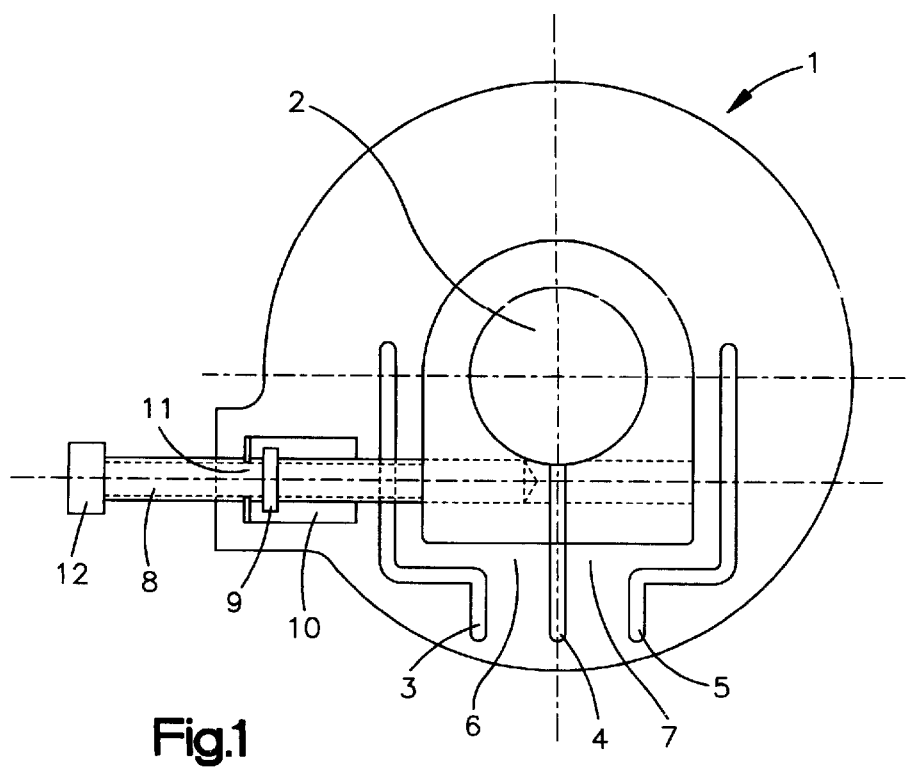
FIG. 1 shows a view of the hub region in the direction of the steering column axis.
Figure 2:
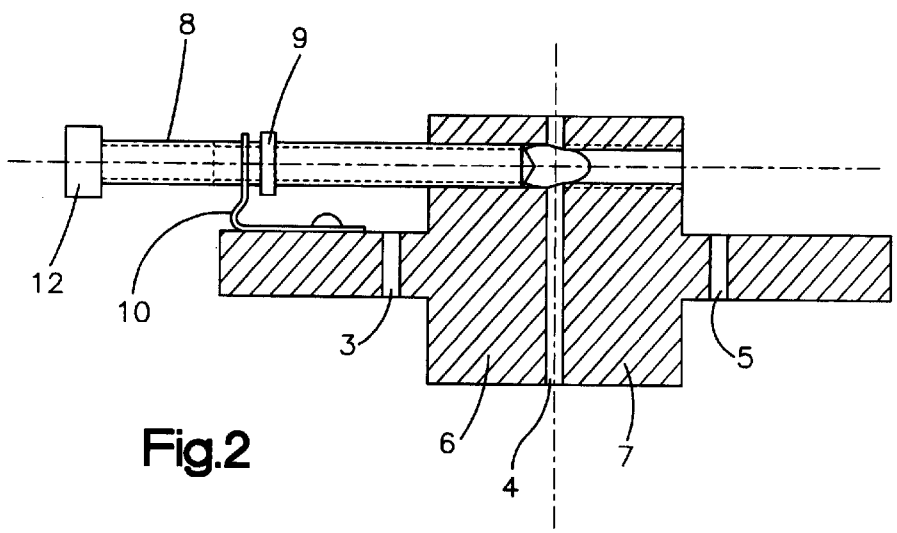
FIG. 2 shows a section through the hub region.

The hub 1 of a steering wheel, illustrated in FIG. 1, has a central cylindrical passage 2 to receive the steering column end and, defined by slits 3, 4, 5 which are arranged parallel to the axis of the passage 2, two free-cut hub sections 6 and 7 which can be tensioned elastically with respect to each other by means of a clamping screw 8 arranged tangentially to the bore 2, after the steering wheel has been placed onto the steering column. As can be seen from FIG. 2, the hub 1 of the embodiment shown has a solid central part and an integral peripheral flange part. The outer slits 3 and 5 run through the flange part, whilst the central slit 4 extends radially from the passage 2 through the solid part and the flange part. Steering wheel spokes (not illustrated) run in a funnel shape from the flange part of the hub 1 to a steering wheel rim (not illustrated).

Figure 3:
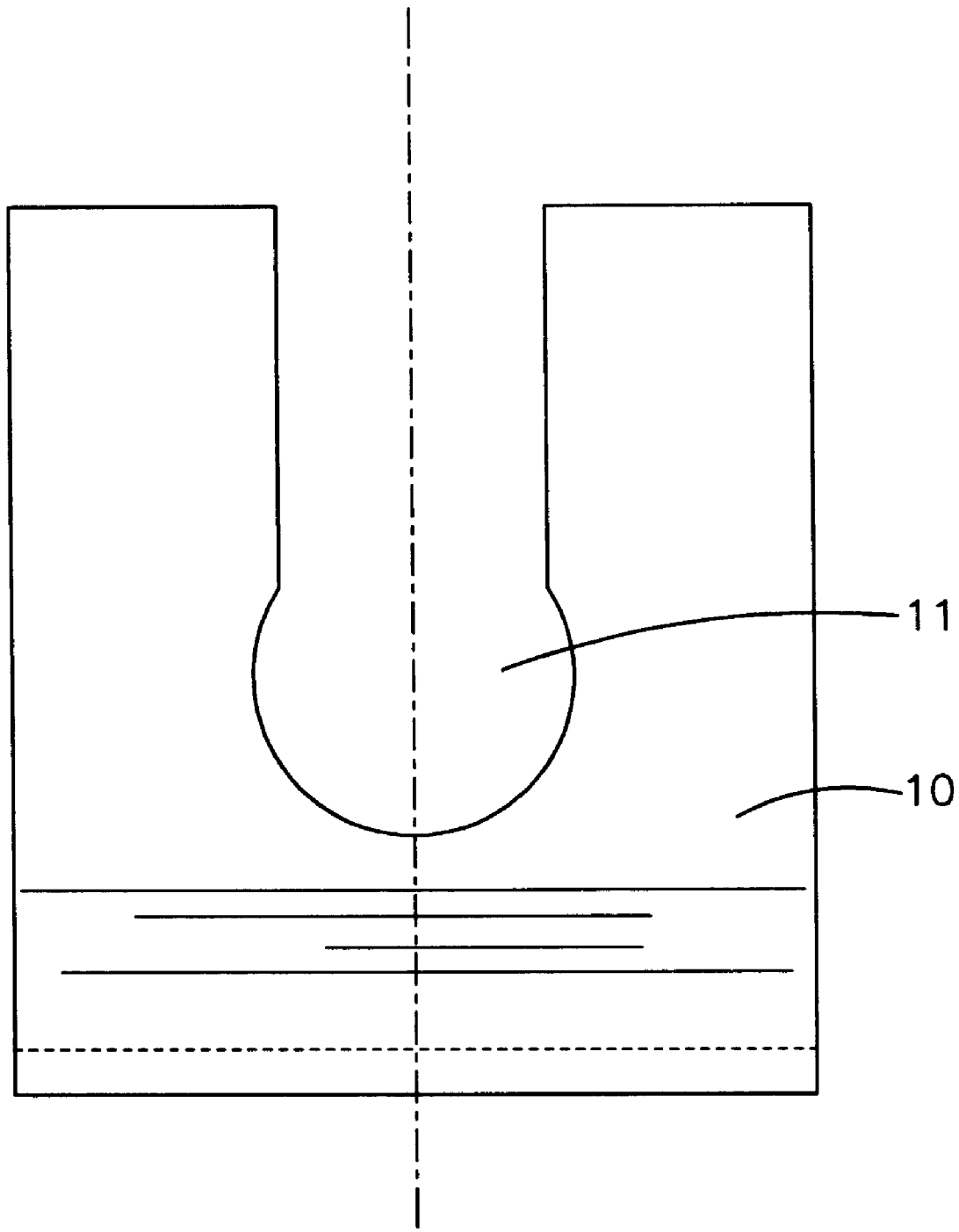
FIG. 3 shows an enlarged view of a spring plate.

The clamping screw 8 has an abutment collar 9 which is arranged approximately on the center part of the clamping screw shaft between the front end thereof and a screw head 12. Between the abutment collar 9 and the screw head 12, a spring plate 10 with a recess 11 adapted to the core diameter of the clamping screw 8 (see FIG. 3) engages into the screw thread, whereby a non-rotatable, axially elastically deflectable screw holder is provided. The spring plate 10 is attached to the outer flange part of the hub which does not take part in the elastic bracing of the hub sections 6 and 7. The clamping screw is illustrated in its retracted position in which it comes out from the inner thread in a bore of the hub 7 and is pulled back so far that it no longer engages tangentially into the encircling groove of the steering column. For mounting the steering wheel, the screw is pushed forward axially by pressure onto the screw head 12, until it engages into the inner thread within hub section 7 and is thereafter rotated until the abutment collar 9 lies externally against the hub section 6 and until the hub sections 6 and 7 are clamped on the steering column end section. In so doing, the clamping screw 8 rotates in the slit 11 of the spring plate 10, which is prestressed on pressing in the screw and remains prestressed until on dismounting of the steering wheel the front end of the clamping screw 8 comes out from the inner thread within hub section 7. The spring plate 10 can then relax and pull the clamping screw 8 back into the illustrated position.

What is claimed is:

1. A steering wheel for vehicles, comprising a hub for attachment on a steering column and a clamping screw, said hub having a central, substantially cylindrical passage for accommodation of an end section of the steering column and at least one slit extending parallel to said passage, at least two hub sections being defined on opposite sides of said slit, said hub sections having aligned bores that extend substantially tangentially to said passage, a first one of said bores having an internal thread, and said clamping screw being adapted to extend through a second one of said bores and to be screwed into the first one of said bores, thereby clamping the hub on said steering column end section, and further comprising a screw holder attached to said hub for limited movement in an axial direction of said clamping screw, said screw holder having a recess for passage of said screw and a portion for simultaneous engagement into the thread of said screw, said screw holder being in a biased condition when said clamping screw passes-through said recess of said screw holder, extends through said second one of said bores and is screwed into the first one of said bores, thereby exerting a force on said clamping screw tending to pull said clamping screw out of the first one of said bores, said clamping screw being movable in an axial direction under the action of said force exerted by said screw holder, said screw holder being in an unbiased condition when said clamping screw is pulled out of the first one of said bores and extends through the second one of said bores.

2. The steering wheel according to claim 1, wherein said screw holder is formed by a bracket of spring steel.

3. The steering wheel according to claim 1, wherein said clamping screw has a shaft with a screw thread formed on substantially the length of said shaft.

4. The steering wheel according to claim 2, wherein said clamping screw has an abutment formed by a radially projecting collar on a central part of said shaft.

5. The steering wheel according to claim 1, wherein said hub comprises a central solid body which includes said hub sections, and an integral flange whereon said screw holder is mounted.

* * * * *